(12) United States Patent
Mizell et al.

(10) Patent No.: US 6,760,344 B2
(45) Date of Patent: Jul. 6, 2004

(54) METHOD AND APPARATUS FOR PROVIDING DIFFERENTIATED QUALITY OF SERVICE IN A GPRS NETWORK

(75) Inventors: Jerry Mizell, Plano, TX (US); James Bankhead, Garland, TX (US); Bala Balachander, Santa Clara, CA (US)

(73) Assignee: Nortel Networks Limited, St. Laurent (CA)

( * ) Notice: Subject to any disclaimer, the term of this patent is extended or adjusted under 35 U.S.C. 154(b) by 752 days.

(21) Appl. No.: 09/745,149

(22) Filed: Dec. 19, 2000

(65) Prior Publication Data

US 2002/0075859 A1 Jun. 20, 2002

(51) Int. Cl.[7] .................................................. H04J 3/24
(52) U.S. Cl. ...................................... 370/475; 370/329
(58) Field of Search ................................ 370/475, 431, 370/437, 438, 442, 443, 310, 328, 329, 337, 347–8, 349; 455/403, 422, 435, 461, 67.3, 556, 561

(56) References Cited

U.S. PATENT DOCUMENTS

| | | | |
|---|---|---|---|
| 6,615,269 B1 * | 9/2003 | Suumaki et al. | 709/230 |
| 6,636,491 B1 * | 10/2003 | Kari et al. | 370/328 |
| 6,683,860 B1 * | 1/2004 | Forssell et al. | 370/329 |
| 6,690,679 B1 * | 2/2004 | Turunen et al. | 370/469 |
| 2001/0033563 A1 * | 10/2001 | Niemela et al. | 370/349 |
| 2002/0075859 A1 * | 6/2002 | Mizell et al. | 370/355 |
| 2002/0077097 A1 * | 6/2002 | Mizell et al. | 455/423 |

* cited by examiner

*Primary Examiner*—David Vincent
(74) *Attorney, Agent, or Firm*—James A. Harrison; Bruce E. Garlick

(57) ABSTRACT

An inventive method and apparatus support quality of service provisioning for a given mobile terminal without requiring changes to established interfaces for the general packet radio service network by assigning a temporary logical link identifier (TLLI) in a manner that implicitly reflects a QoS rating for a mobile terminal. In one embodiment of the present invention, a serving GPRS support node (SGSN) assigns a temporary logical link identifier (TLLI) within a first range for a first QoS rating and within a second range for a second QoS rating. Alternatively, the SGSN assigns a temporary logical link identifier having an even numerical value for a first QoS rating and an odd numerical value for a second QoS rating. Upon receiving a TLLI value, a base station and the corresponding mobile terminal may both evaluate the TLLI number to determine the assigned QoS rating for the mobile and to allocate communication resources in a corresponding manner. As an additional aspect of the present invention, the base station determines what resources to assign to a mobile terminal based upon a received TLLI number whenever a mobile terminal requests system resources and whenever it registers its presence with the base station.

20 Claims, 6 Drawing Sheets

METHOD AND APPARATUS FOR PROVIDING DIFFERENTIATED QUALITY OF SERVICE IN A GPRS NETWORK

BACKGROUND

1. Technical Field

The present invention relates generally to mobile communication systems and more particularly, to general packet radio services for delivering data over a circuit switched telephone network.

2. Related Art

The general packet radio service (GPRS) is a new non-voice value added service that allows information to be sent and received across a mobile telephone network. It supplements, or rides on top, of today's circuit switched data and short message service networks. The theoretical maximum speed of GPRS includes speeds of up to 171.2 kilobits per second (kbps). This maximum speed is achievable in GPRS systems using all eight timeslots at the same time in a time division multiple access (TDMA) context.

This speed is about three times as fast as data transmission speeds possible over today's fixed telecommunication networks and ten times as fast as current circuit switched data services on Global System for Mobile Communications (GSM) standard TDMA networks. Thus, GPRS systems are advantageous in that they require less system resources to transmit a fixed amount of data in comparison to using a traditional circuit switched approach. By allowing information to be transmitted more quickly, immediately, and efficiently, across the mobile network, GPRS may well be a relatively less costly mobile data service compared to SMS and circuit switched data services.

GPRS also facilitates instant connections in which information can be sent or received immediately as the need arises, subject to radio coverage. No dial up modem connection is necessary. GPRS, similar to some broadband connections for personal computers, often is referred to as being "always connected." Thus, another one of the advantages of GPRS is that data may be transmitted immediately, whenever the need arises. In contrast to circuit switched data networks in which a connection must be established to transmit a data packet or data file, GPRS operation is extremely efficient in those situations in which a small amount of data is to be sent.

As the emphasis of many designs today are to create wireless computer networks, and to connect data devices including personal computers to wireless transceivers and mobile terminals, such a system that provides instantaneous response is very important for time critical applications, and, more generally, for the implementation of wireless computer networks.

For example, a remote credit card authorization system implemented in a wireless network can be greatly improved if it is unnecessary for the customer to wait the amount of time that is required to establish a connection. Anyone that has waited at a cash register for credit authorization while a modem dials in and transmits account information can readily appreciate this advantage.

Additionally, GPRS facilitates the use of Internet applications not only from personal computers, but also from appliances and machines. It is anticipated that appliances will be designed to be coupled to the Internet to facilitate control either onsite or remotely. While some people envision connecting these appliances to a network port by physical lines, it would clearly be advantageous to be able to connect such appliances to the Internet through a wireless link. GPRS will facilitate the creation of Internet controlled appliance networks through a wireless medium.

As suggested before, GPRS involves overlaying a packet based air interface on an existing circuit switched wireless network. For example, the circuit switched wireless network may comprise a GSM network. Accordingly, the user is given an option to utilize a packet based data service. In order to overlay a packet based air interface over a circuit switched network, the GPRS standard defines new infrastructure nodes to minimize the impact to existing networks in terms of hardware and software.

One advantage of GPRS is that the packet switching that results from the infrastructure nodes allows the use of GPRS radio resources only when users actually are sending or receiving data. Unlike traditional circuit switched voice networks, a connection is not continuously reserved for a user for the intermittent transmission of data. This efficient use of scarce radio resources means that larger number of GPRS users can share the same bandwidth and be served from a single base station or cell. The actual number of users, of course, that may use the system at one time depends on the amount of data being transferred.

As mentioned above, GPRS can obtain transmission data speeds of 171.2 kbps. To obtain such a speed, however, a user would have to transmit data packets over all eight timeslots without any air protection. In reality, network operators probably will rarely allow all timeslots to be used by a single GPRS user. Additionally, GPRS terminals are expected to be limited to using just a subset of the available timeslots in a TDMA network. The bandwidth available to GPRS, therefore, is limited. Because this bandwidth is limited, it is anticipated that throughput capacity issues will occasionally be experienced.

There is, therefore, a need realized by the present inventors to implement a quality of service rating scheme to assist the network provider in assigning priority among the various users competing for the scarce radio resources. One problem, however, is that the present GPRS over the air interfaces do not contain provisioning for quality of service ratings. Accordingly, while there is a need to establish a quality of service implementation, doing so is difficult without creating an interface change. One problem with creating an interface change to support QoS provisioning, however, is that it would require interface changes including software and perhaps hardware changes to all existing GPRS equipment. Thus, it would be desirable, if possible, to implement a QoS system that does not require software or hardware changes in existing equipment to render that equipment compatible with a change to the over-the-air interface. What is needed, therefore, is a method and apparatus that supports QoS provisioning without changing the interface so that there will be no impact on existing GPRS equipment.

SUMMARY OF THE INVENTION

An inventive method and apparatus support quality of service provisioning for a given mobile terminal without requiring changes to established interfaces for the general packet radio service network. More specifically, a temporary logical link identifier (TLLI) is assigned in a manner that implicitly reflects a QoS rating for a mobile terminal. In one embodiment of the present invention, a serving GPRS support node (SGSN) assigns a TLLI within a first range for a first QoS rating and within a second range for a second QoS rating. Alternatively, the SGSN assigns a TLLI having an even numerical value for a first QoS rating and an odd numerical value for a second QoS rating.

In an alternative embodiment of the invention, the TLLI assignments are arranged in a plurality of ranges, wherein each of the plurality of ranges reflects a corresponding QoS rating. Accordingly, differentiated QoS can be provided between the SGSN and a base station subsystem by associating the quality of service with a value range for the TLLI.

In operation of one embodiment of the present invention, whenever a mobile terminal attaches to the GPRS network, a subscriber profile is downloaded from a home location register (HLR) by the SGSN. The subscriber profile contains information indicating the quality of service allowed for the mobile terminal. Based upon the profile information, the SGSN assigns a TLLI in the appropriate characteristic. The characteristic may be an even or odd value of the TLLI, a value that is within a numerical range or a value determined by a formulaic calculation. The SGSN can control the priority of data transmissions being sent to each mobile terminal by using the assigned TLLI to imply a corresponding QoS rating for the mobile terminal. Alternatively, the SGSN determines a QoS rating based upon call parameters such as call type. Accordingly, the SGSN generates and transmits a TLLI number to the base station for delivery to the mobile station based upon the determined QoS rating.

The base transceiver system (BTS) that receives the TLLI reflecting a QoS rating may utilize the TLLI in a plurality of ways. First, the BTS may use the TLLI value in deciding what air link resources to allocate to the mobile terminal. Secondly, the BTS may use the TLLI for prioritizing transmissions of a mobile terminal originated data on the backhaul in the base station subsystem.

This solution may be implemented within the current standards, with no changes to the interface with the mobile terminal, as long as the scheme is supported by the SGSN and the BSS. This invention is applicable to GPRS products for both GSM and North American TDMA systems as well as all other time division multiple access systems.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
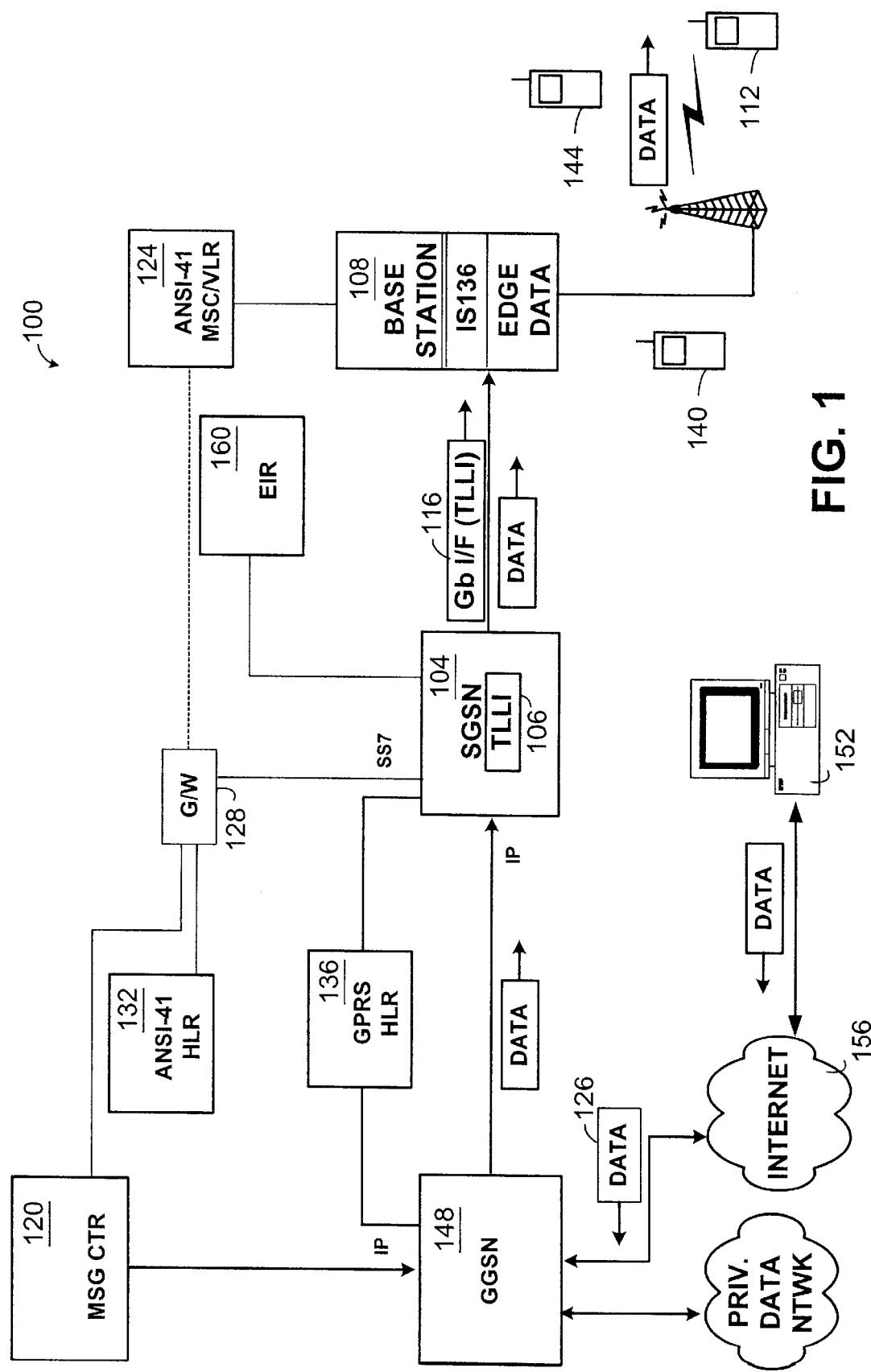
FIG. 1 is a functional block diagram illustrating a GPRS network that can provide differentiated quality of service capability according to one embodiment of the present invention.

FIG. 1 is a functional block diagram illustrating a GPRS network that can provide differentiated quality of service capability according to one embodiment of the present invention. A GPRS network 100 includes an SGSN 104 that is coupled to a plurality of network elements including a base station 108 that communicates with a mobile terminal 112. Base station 108 includes an IS-136 voice radio for transmitting and receiving voice communications with mobile terminal 112 as well as an edge data radio for transmitting and receiving data packets from mobile terminal 112. It is understood that mobile terminal 112 may be any one of a voice radio, a data transceiver, or a combination of both.

ETSI standard 3.60 defines the interface between the serving GPRS support node and the base station subsystem. This interface often is referred to as the Gb interface. The Gb interface (Gb I/F) as specified utilizes frame relay protocols to transport data between the BSS and the SGSN. A temporary logical link identifier is transmitted as a part of the Gb interface. Accordingly, as may be seen from referring to FIG. 1, Gb interface signals 116 are transmitted back and forth between SGSN 104 and BS 108. Gb interface signals 116 include the temporary logical link identifier that is used herein for, among other purposes, defining a QoS rating for mobile terminal 112.

A message center 120 is coupled to communicate through a gateway 128 with SGSN 104 as well as with an ANSI-41 MSC/VLR 124. MSC/VLR 124 also is coupled to base station 108 to provide routing and traditional visitor location register information as needed by the base station 108. Operation of ANSI-41 MSC/VLR 124 is well known in the art. Additionally, message center 124 is coupled to communicate with gateway 128 that, in turn, is coupled to communicate with ANSI-41 HLR 132. ANSI-41 HLR is for providing home location register information in support of voice communications for mobile terminal 112.

As has been described elsewhere, the present GPRS network is an overlay network meaning that it is attached to existing networks to provide the GPRS capability. Accordingly, the GPRS network 100 of FIG. 1 includes traditional voice or circuit switched network elements such as ANSI-41 HLR 132. Additionally, the network includes a GPRS HLR 136 that is coupled to SGSN 104. GPRS HLR 136 provides HLR information for mobile terminals 112 that comprise, at least in part, edge data radio circuitry. Thus, if mobile terminal 140 is strictly an IS-136 radio, while mobile terminal 112 includes IS-136 as well as edge radio circuitry, and mobile terminal 140 is purely an edge radio, then HLR 132 and 136 will have different roles with respect to providing HLR data. ANSI-41 HLR 132 will provide mobile terminal data for mobile terminal 140 and 112 while GPRS HLR 136 will provide mobile terminal data for mobile terminal 112 and mobile terminal 144. Both HLRs 132 and 136 may provide data for mobile 112 since it has ANSI-41 and Edge Data capability.

As may also be seen, SGSN 104 is coupled to a gateway GPRS support node system 148 that is coupled to a user terminal 152 by way of an IP network 156. Gateway GPRS support node (GGSN) 148 provides gateway functionality between the SGSN 104 and the IP network 156. Because there are many different types of radios and mobile terminals that may communicate through the circuit switched network, or the data packet network of the network 100, and equipment identity register 160 is provided to communicate with SGSN 104 whenever SGSN 104 requires equipment identity information.

In operation, whenever a mobile terminal 112 or 144 registers with the network through base station 108, base station 108 transmits identity information of the mobile terminal in Gb interface signal 116 to SGSN 104. SGSN 104 responds by assigning a TLLI to the mobile terminal 112 or 144. As a part of assigning the TLLI to the mobile terminal 112 or 144, SGSN examines the mobile ID to determine a quality of service rating for the mobile. Alternatively, SGSN 104 examines the type of call being placed by mobile terminal 112 or 144. By way of example, if the call is purely a data call, a lower quality of service rating may be assigned while a higher quality of service rating may be assigned if the call being set up is a voice call or if the call is a continuous bit rate (CBR) call requiring significant throughput capacity. Thus, the TLLI that is assigned can be a function of not only the mobile station ID, but also the type of call being placed. Thus, SGSN 104 assigns a TLLI and transmits the TLLI in the Gb interface signal 116 to base station 108. Base station 108, upon receiving Gb interface signal 116, extracts the TLLI that is assigned to the mobile terminal 112 or 144 and transmits the same to the mobile terminal. The base station then transmits data and assigns traffic channels according to a QoS rating implied by the TLLI number. Similarly, mobile terminal 112 transmits data on the reverse link according to the QoS that is implied by the TLLI number.

Figure 2:
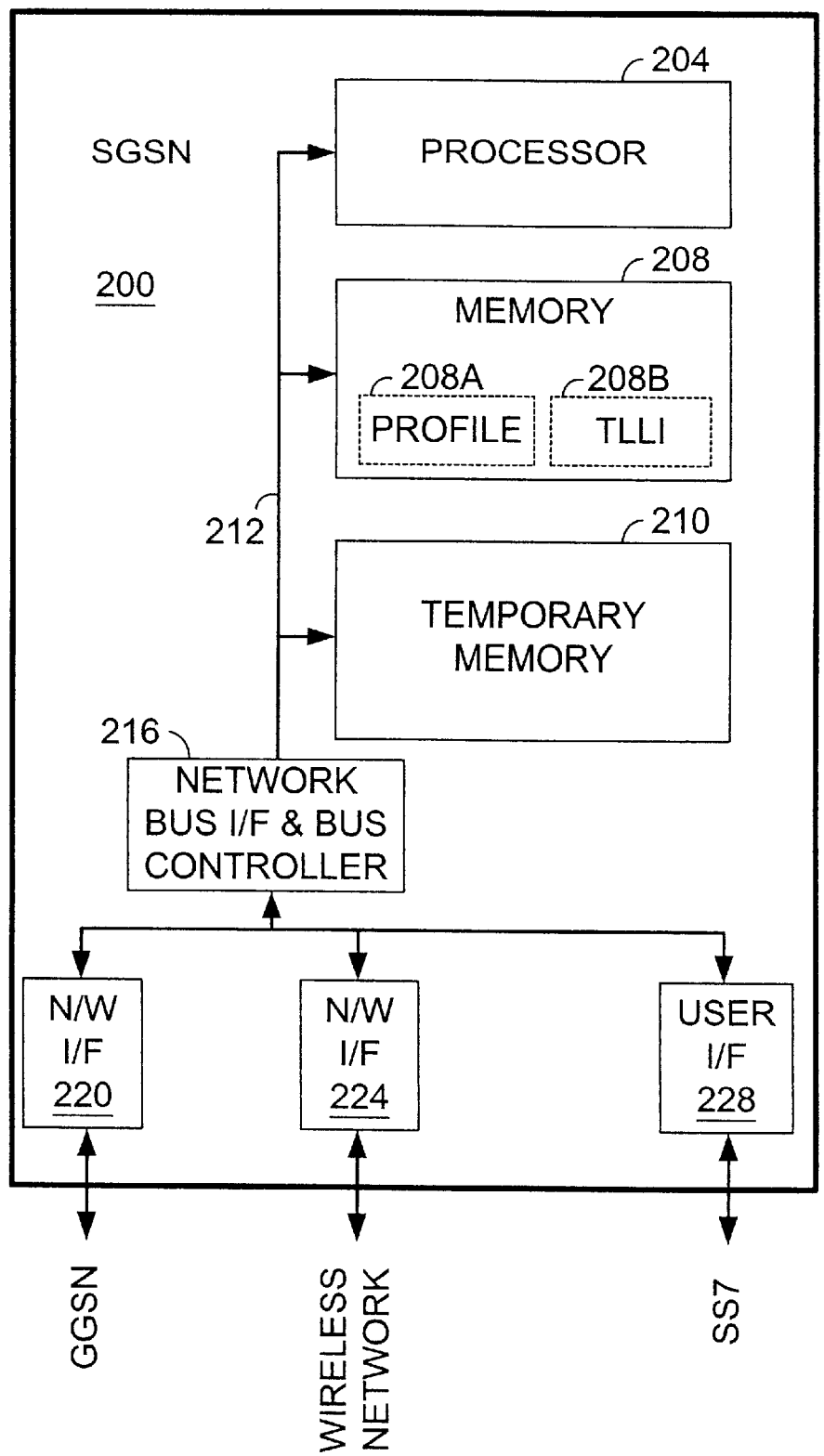
FIG. 2 is a functional block diagram of a serving GPRS support node according to one embodiment of the present invention.

FIG. 2 is a functional block diagram of a serving GPRS support node according to one embodiment of the present invention. Referring now to FIG. 2, an SGSN 200 includes a processing unit 204, a memory 208 and temporary memory 210. Each is connected to an internal bus 212. Internal bus 212 further is connected to a bus controller 216 that controls the timing, synchronization, and more generally, the bus communications on bus 212.

Memory 208 includes computer instructions that define the operational logic of SGSN 200 as well as logic for assigning the temporary logical link identifiers to the mobile terminals. Memory 208 further includes profile information and logic for obtaining profile information from an external system such as an HLR, whenever necessary.

Memory 210 includes temporary memory buffers for storing operational data created or received during processing. Processing unit 204, therefore, communicates with memory 208 by way of bus 212 to receive the computer instructions and memory 210 for obtaining temporary data stored therein. Processing unit 204 then executes the computer instructions within memory 208 and operates upon the data stored within memory 210 to effectuate the operational logic defined by the computer instructions stored within memory 208.

Bus controller 216 further is coupled to a plurality of network interface ports 220, 224 and 228 for communicating with external devices. By way of example, network interface port 220 may be for communicating over a world wide web while network interface port 224 may be for communicating over a communication network by way of a gateway GPRS support node. Network interface port 228 also may be for communicating with networks of other types such as SS7 telephone networks. While FIG. 2 illustrates only three network ports, it is understood that the SGSN of FIG. 2 is not limited to three ports and may be a great number of ports for supporting the topology shown in FIG. 1, by way of example.

The operational logic defined by the computer instructions stored within memory 208 are described in greater detail in reference to the method and process steps described herein this application that relate to the present invention. In general, however, processing unit 204 executes the computer instructions within memory 208 to determine a corresponding QoS rating for a mobile terminal 112 or 144 and to transmit a corresponding TLLI within Gb interface signal 116.

Figure 3:
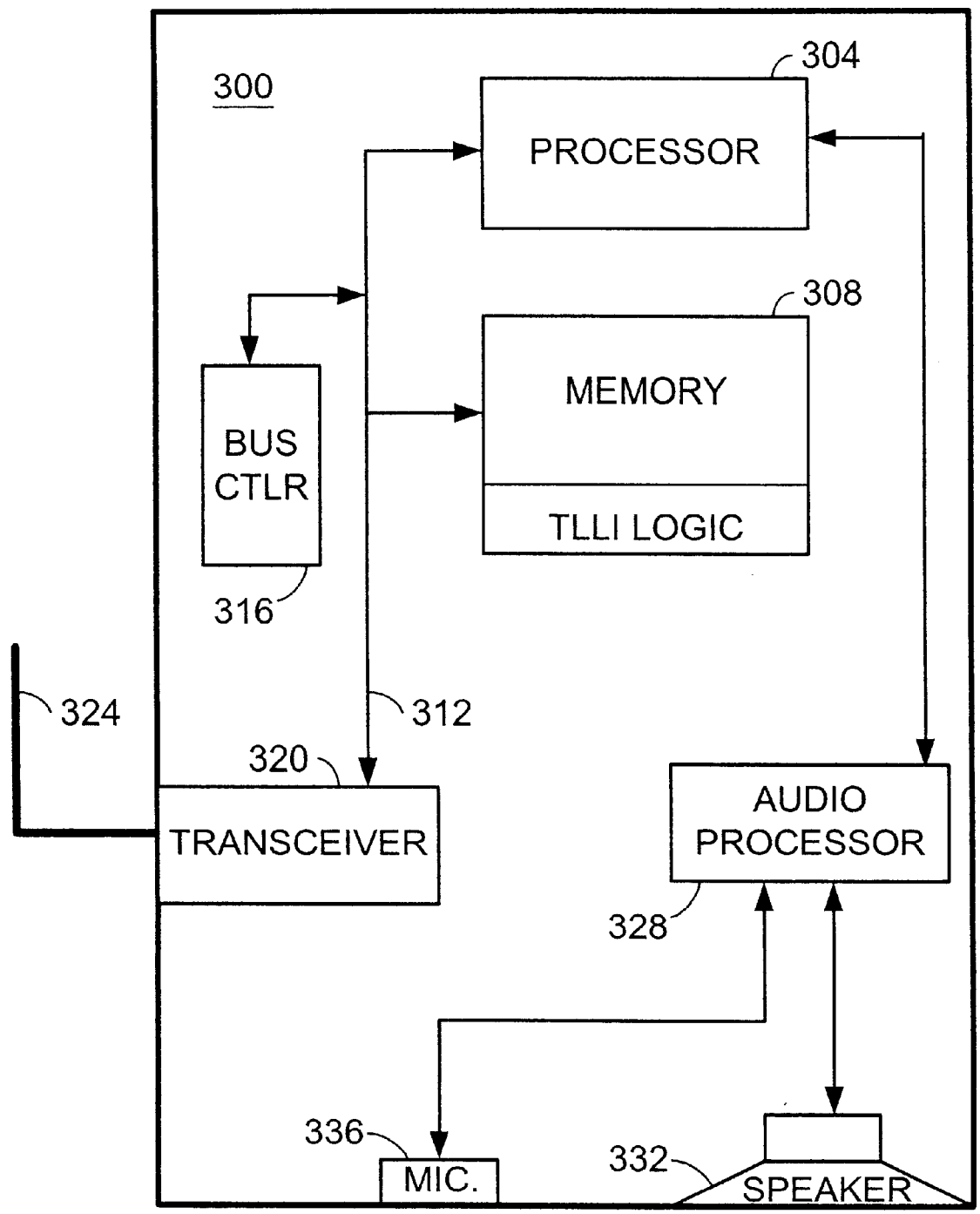
FIG. 3 is a functional block diagram of a mobile terminal formed according to one embodiment of the present invention.

FIG. 3 is a functional block diagram of a mobile terminal formed according to the present invention. Mobile terminal 300 includes a processing unit 304 and a memory 308 both of which are coupled to an internal bus 312. Internal bus 312 is coupled and controlled by a bus controller 316 that controls the communications thereon bus 312. Memory 308 includes computer instructions for execution by processing unit 304, which computer instructions define the operational logic of mobile terminal 300. Additionally, the computer instructions stored within memory 308 define the operational characteristics of the mobile with respect to a received TLLI transmitted by an external base station. More specifically, the memory 308 defines the operational logic that causes the mobile terminal 300 to operate and transmit its communication signals according to the defined quality of service ratings implied by the TLLI number received from the base station in a Gb I/F signal. For example, if the TLLI indicates a first quality of service rating, then the mobile terminal 300 transmits data packets having a first quality of service characteristic. If the TLLI number received from the base station indicates a second quality of service rating, then mobile terminal 300 transmits data packets being characterized by the second quality of service rating for the mobile terminal.

Thus, as mobile terminal 300 communicates, processing unit 304 transmits signals onto bus 312 that are sent to transceiver 320, which then transmits the same over antenna 324 having the defined QoS characteristic as a result of its QoS rating. As may also be seen, mobile terminal 300 includes audio processing circuitry 328 to replay received signals that have been converted to audio over a speaker 332. Audio processing circuitry 328 also is coupled to a microphone 336 to receive voice and to convert the voice to communication signals that are processed by processing unit 304.

Figure 4:
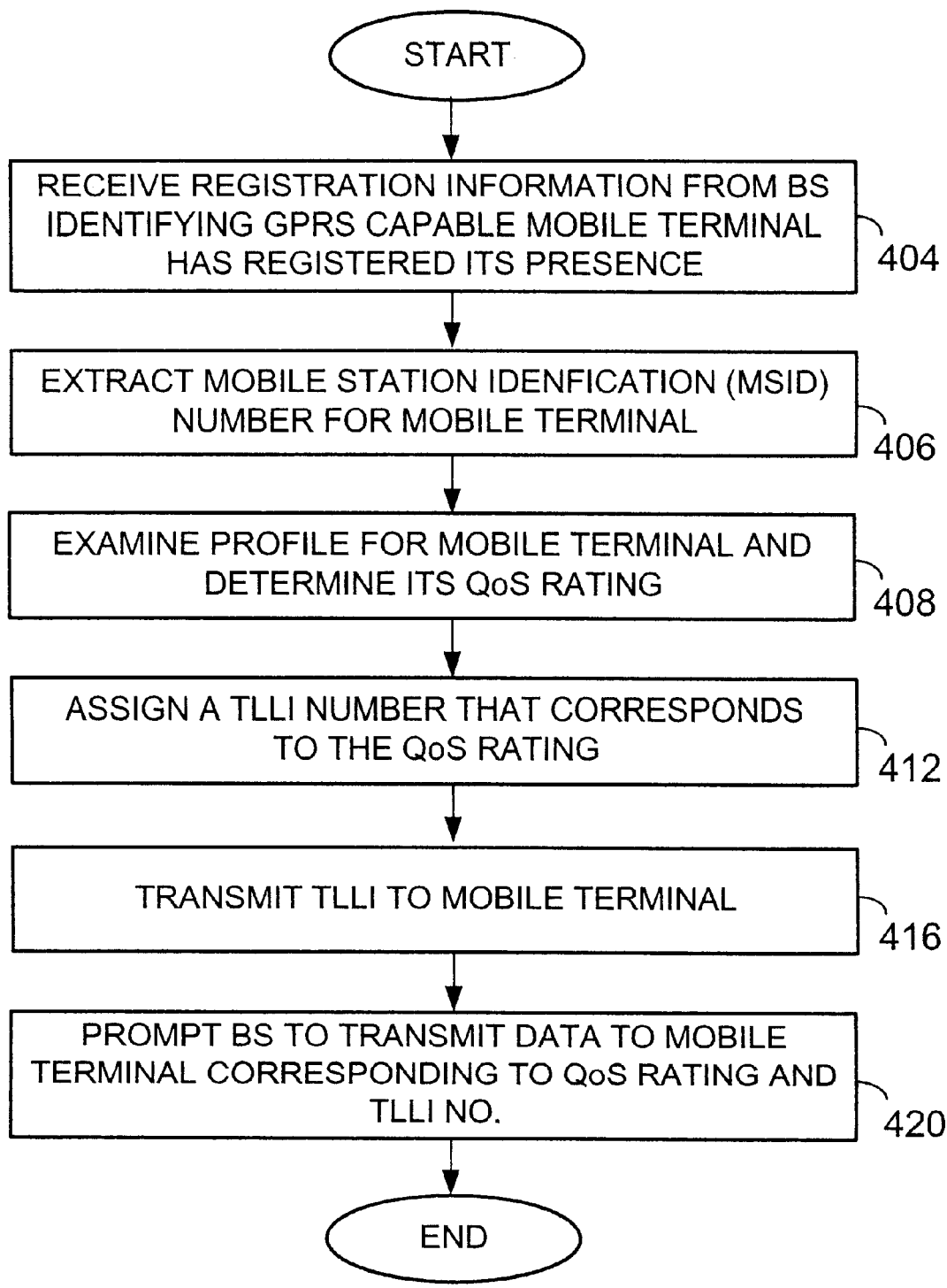
FIG. 4 is a flow chart illustrating a method performed by an SGSN for providing differentiated quality of service in an existing GPRS network according to one embodiment of the present invention.

FIG. 4 is a flow chart illustrating a method within an SGSN for transmitting data to a mobile terminal by way of a wireless data packet network according to one embodiment of the present invention. Whenever a mobile terminal registers its presence within the mobile network, the SGSN receives the registration information from a base station and determines that the mobile terminal being registered is a GPRS capable mobile terminal (step 404). Thereafter, the SGSN extracts the MSID from the registration information (step 406) and examines the mobile profile to determine the quality of service rating for the mobile terminal (step 408).

As has been mentioned elsewhere, the quality of service rating for a mobile terminal may also or exclusively be a function of whether the call being processed is a voice call or a data call. Alternatively, the quality of service rating may be a function of the mobile station ID as well as the type of call being placed. Finally, the quality of service rating may be a function of requested quality of service by the mobile terminal. In such a case, the mobile terminal would specify a preferred quality of service rating for the particular call that is next set up. Finally, the quality of service may be exclusively due to a subscription plan that categorizes the mobile terminal's quality of service rating.

After determining, based upon any or all of the above factors, the quality of service rating for the mobile terminal, the SGSN assigns a TLLI that reflects the quality of service rating (step 412). As has been described before, different schemes may be implemented.

In one scheme, the TLLI's may fall into a plurality of ranges of numbers wherein a number within each range reflects the quality of service rating. Alternatively, if only two quality of service ratings are provided for, then a quality of service rating may be assigned to a mobile terminal by assigning either an even or an odd TLLI number wherein even represents a first quality of service rating and odd represents a second quality of service rating. The TLLI that is assigned to the mobile terminal is then transmitted to the mobile terminal by way of a base station (step 416). More specifically, the SGSN transmits the TLLI number in a Gb interface signal. Thereafter, data is transmitted to the mobile terminal from the SGSN having the corresponding quality of service rating (step 420).

Figure 5:
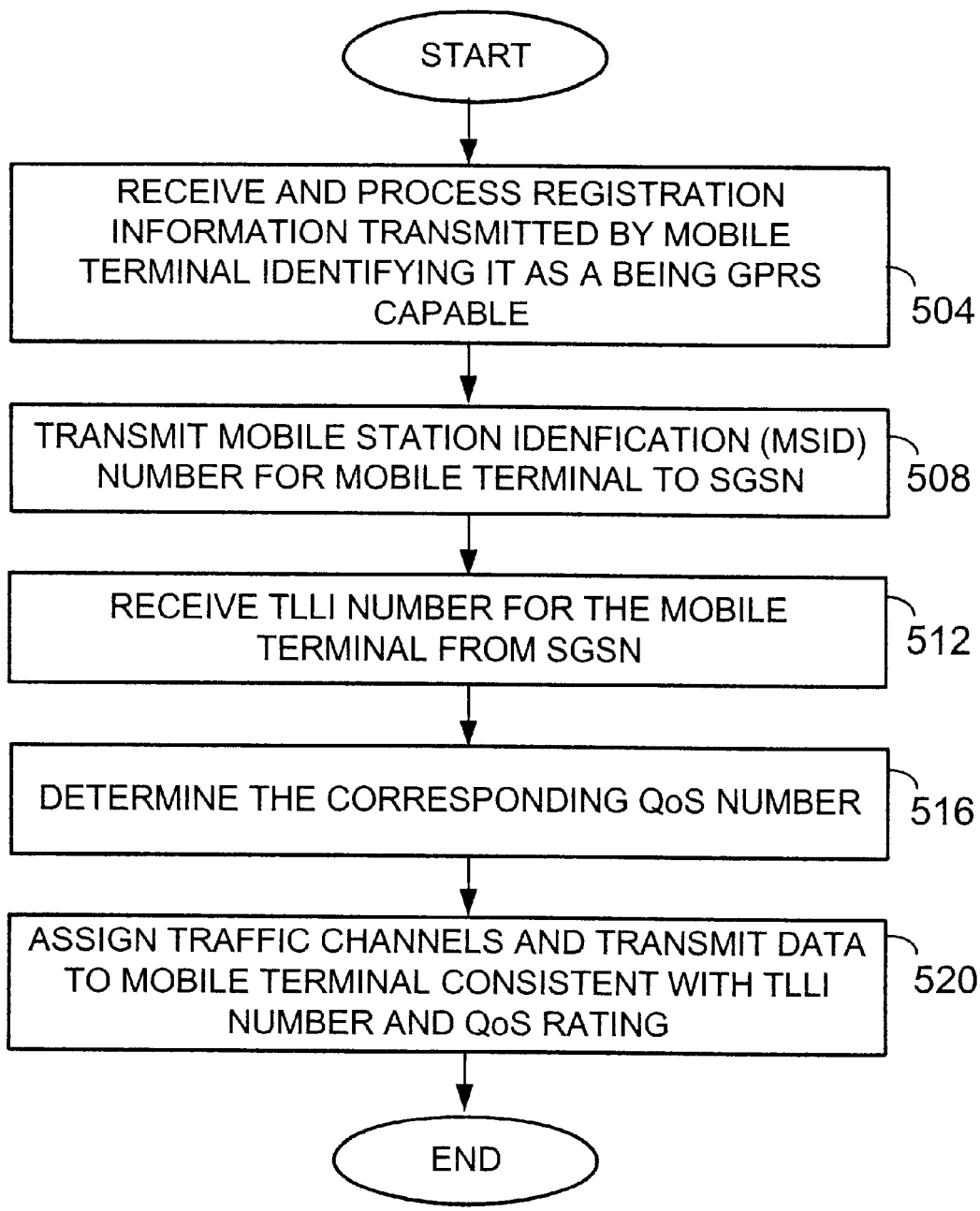
FIG. 5 is a flow chart illustrating a method performed by a base station for providing differentiated quality of service in an existing GPRS network according to one embodiment of the present invention.

FIG. 5 is a flow chart illustrating a method performed by a base station for providing differentiated quality of service in an existing GPRS network according to one embodiment of the present invention. Initially, the base station communicates with the mobile terminal whenever the mobile terminal registers its presence within a cell served by the base station (step 504). After registration is complete, the base station transmits the mobile ID information to the SGSN within the Gb interface signals (step 508). The base station receives the TLLI for the mobile terminal from the SGSN (step 512). The base station then determines a corresponding quality of service metric for the mobile terminal based on the TLLI number that was received in the Gb interface (step 516). Thereafter, the base station assigns traffic channels to the mobile terminal and transmits data thereto according to its determined QoS rating (step 520).

Figure 6:
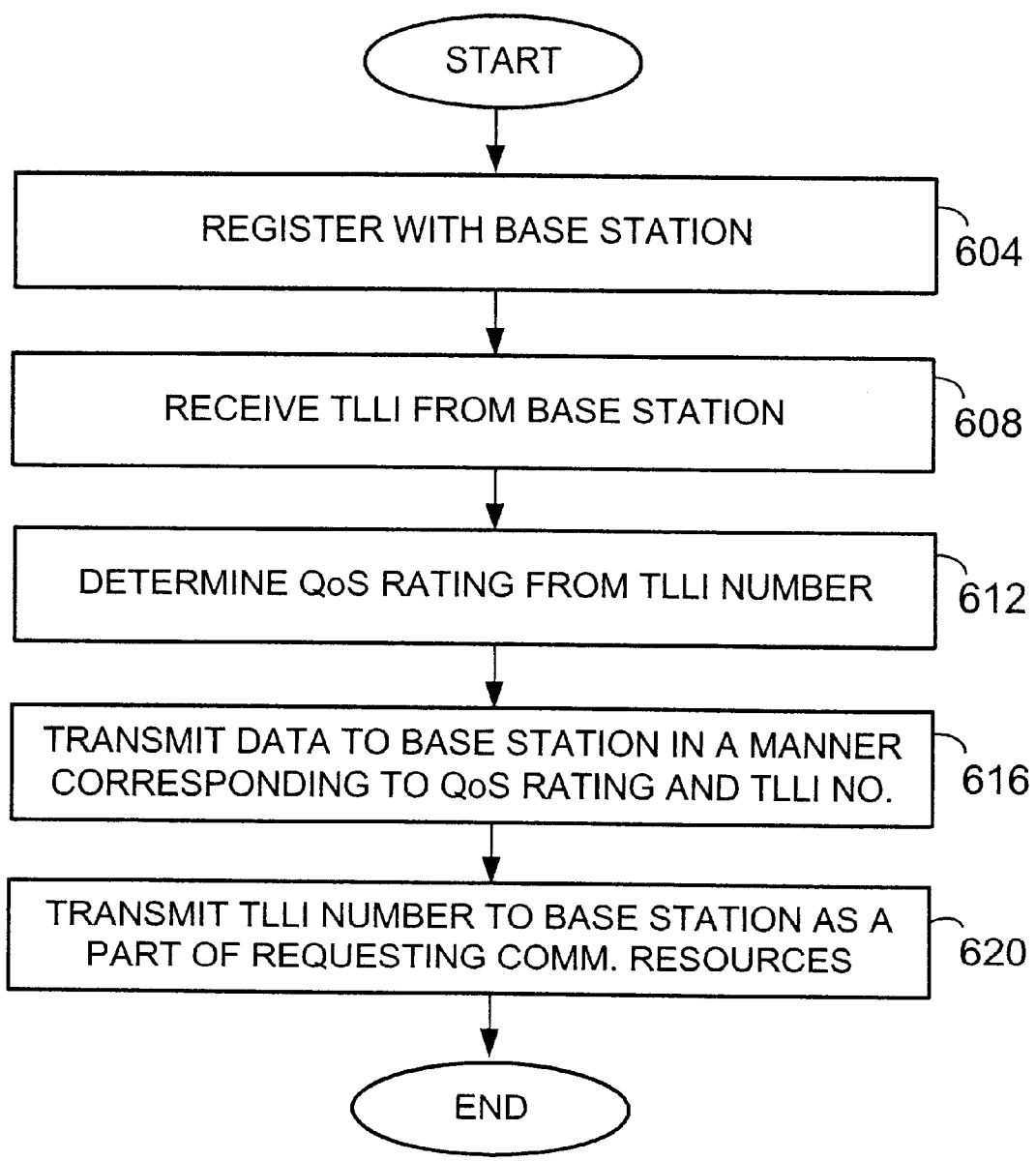
FIG. 6 is a flow chart illustrating a method performed by a mobile terminal for providing differentiated quality of service in an existing GPRS network according to one embodiment of the present invention.

FIG. 6 is a flow chart illustrating a method performed by a mobile terminal for providing differentiated quality of service in an existing GPRS network according to one embodiment of the present invention. Initially, a mobile terminal registers with a base station (step 604). Some time after transmitting signals to the base station as a part of the registration process, the mobile terminal receives a communication signal from the base station, which communication signal includes a TLLI value (step 608). From the received TLLI, the mobile terminal determines its own QoS rating (step 612). Thereafter, the mobile terminal transmits to the base station in a manner consistent with its QoS rating (step 616). In one embodiment of the present invention, the base station does not remember the TLLI of the various mobile terminals. Rather, each mobile terminal provides its currently assigned TLLI whenever it is requesting service on the air link (step 620). The BTS then uses the received TLLI from the mobile terminal to determine the QoS for the mobile and to determine what correspond air link resources to allocate to the mobile terminal. Such a method is particularly advantageous in that a mobile station, by knowing its assigned QoS rating, may request resources consistent with its QoS rating thereby decreasing the amount of time required for a base station to determine that the mobile is not allowed to get maximum resources. As mobile terminals, without knowledge of their own QoS ratings are typically formed to request resources without specifying a QoS rating or corresponding resource amounts, a system without the ability to deliver a QoS rating to the mobile is inefficient in that the base station must determine the QoS rating of the mobile terminal prior to assigning resources. Because the present mobile terminal transmits its TLLI as a part of requesting resources for a call or data transmission, which TLLI reflects a QoS rating, the base station is able to more readily assign appropriate resource capacity. In an alternate method currently not adopted by the standards, the base station stores the TLLI for the mobile terminal for prioritizing and transmissions of mobile terminal originated and terminated data grams.

The inventive method and apparatus disclosed herein are particularly advantageous in that they provide a capability for providing QoS in a GPRS network without requiring changes to the presently defined interface and in a manner that allows new GPRS ready mobile terminals to be incorporated into a GPRS network while maintaining compatibility with existing GPRS mobile terminals.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. As may be seen, the described embodiments may be modified in many different ways without departing from the scope or teachings of the invention. For example, any combination of the described methods may be combined to implementing QoS provisioning in existing GPRS systems without requiring an interface change. Additionally, any method of grouping TLLI numbers to represent QoS ratings may be used. By way of example, formulaic results may be used to characterize a QoS rating of a mobile terminal.

What is claimed is:

1. A serving GPRS support node (SGSN), comprising:
    circuitry for assigning a temporary logical link identifier (TLLI) to a mobile terminal according to a quality of service (QoS) rating of the mobile terminal whenever the SGSN receives a signal containing a mobile station ID (MSID) identifying the mobile terminal as being GPRS capable; and
    circuitry for transmitting the TLLI to a base station in communication with the mobile terminal.

2. The SGSN of claim 1 wherein the circuitry determines the mobile terminal's QOS rating by examining a subscriber profile in relation to the MSID.

3. The SGSN of claim 1 wherein the circuitry determines the mobile terminal's QoS rating by examining the type of call being made wherein voice calls are assigned a first QoS rating and data calls are assigned a second QoS rating.

4. The SGSN of claim 2 wherein the circuitry for transmit ting the TLLI places the TLLI value within a known Gb interface signal.

5. The SGSN of claim 2 coupled to communicate with an equipment identity register and with a home location register to obtain profile information that corresponds to the MSID as necessary.

6. A GPRS network, comprising:
    a gateway GPRS support node (GGSN) for interfacing external systems with the GPRS network;
    a GPRS home location register (HLR) for providing profile information about subscriber accounts;
    an equipment identity register (EIR) for providing equipment information including protocol information for GPRS capable mobile terminals; and
    a serving GPRS support node (SGSN) coupled to communicate with the GGSN, the GPRS HLR, and the EIR, the SGSN further being coupled to exchange communication signals with a base station wherein the SGSN is formed to assign TLLI numbers according to a corresponding QoS rating defined in the HLR for a given mobile terminal.

7. The system of claim 6 wherein the SGSN is made to assign TLLI numbers having a first characteristic representing a first QoS rating and a second characteristic representing a second QoS rating.

8. A method of informing a mobile terminal of an assigned QoS rating, comprising:

selecting a TLLI number having a specified characteristic, wherein the specified characteristic corresponds to the assigned QoS rating; and transmitting the TLLI number to a base station for delivery to the mobile terminal.

9. The method of claim 8 wherein the specified characteristic relates to an even or odd value of the TLLI.

10. The method of claim 8 wherein the specified characteristic relates to the numerical value of the TLLI wherein numerical values within a first range represent a first QoS rating and numerical values within a second range represent a second QOS rating.

11. The method of claim 8 wherein the specified characteristic relates to a numerical answer produced by a defined formula.

12. A Serving GPRS Support Node, comprising:

a processor;

an internal bus coupled to the processor;

an internal bus controller coupled to control communications on the internal bus; and a memory coupled to the bus, the memory containing computer instructions for execution by the processor that define the SGSN operational logic, wherein the computer instructions define logic to prompt the SGSN to:

determine a QoS rating for a mobile terminal based upon its mobile station ID; and assign a number for transmission to a base station for delivery to the mobile station wherein the number reflects the determined QoS rating.

13. The SGSN of claim 12 wherein the computer instructions define logic to assign a TLLI number having an odd value if the mobile terminal has a first QoS rating.

14. The SGSN of claim 13 wherein the computer instructions define logic to assign a TLLI number having an even value if the mobile terminal has a second QoS rating.

15. The SGSN of claim 12 wherein the computer instructions define logic to assign a TLLI number having a value within a first range of values if the mobile terminal has a first QoS rating.

16. The SGSN of claim 12 wherein the computer instructions define logic to assign a TLLI number having a value within a second range of values if the mobile terminal has a second QoS rating.

17. The SGSN of claim 12 wherein the computer instructions define logic to assign a TLLI number having a value within a third range of values if the mobile terminal has a third QoS rating.

18. The SGSN of claim 12 wherein the computer instructions define logic to prompt it to communicate with a GPRS HLR to determine a subscriber profile for the mobile terminal.

19. The SGSN of claim 12 wherein the computer instructions define logic to prompt it to communicate with a GPRS HLR to determine a QoS rating for the mobile terminal.

20. The SGSN of claim 12 wherein the computer instructions define logic to prompt it to evaluate a call's characteristics as a part of determining a QoS rating that should be assigned to a mobile terminal for a data call that is being setup.

* * * * *